United States Patent
Holm-Blagg

(10) Patent No.: US 7,949,594 B2
(45) Date of Patent: May 24, 2011

(54) SYSTEMS AND METHODS FOR PARTICIPANT CONTROLLED COMMUNICATIONS REGARDING FINANCIAL ACCOUNTS

(75) Inventor: Lynn Holm-Blagg, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1867 days.

(21) Appl. No.: 10/672,596

(22) Filed: Sep. 26, 2003

(65) Prior Publication Data
US 2005/0080691 A1 Apr. 14, 2005

(51) Int. Cl.
*G06Q 40/00* (2006.01)
(52) U.S. Cl. .............. 705/37; 705/35; 705/36; 705/38
(58) Field of Classification Search .......... 364/406, 364/408; 235/379; 705/35–38
See application file for complete search history.

(56) References Cited

U.S. PATENT DOCUMENTS

| | | |
|---|---|---|
| 4,256,955 A | 3/1981 | Giraud et al. |
| 4,321,672 A | 3/1982 | Braun et al. |
| 4,679,191 A | 7/1987 | Nelson et al. |
| 4,700,055 A | 10/1987 | Kashkashian, Jr. |
| 4,816,653 A | 3/1989 | Anderl et al. |
| 4,837,422 A | 6/1989 | Dethloff et al. |
| 4,900,903 A | 2/1990 | Wright et al. |
| 4,918,602 A | 4/1990 | Bone et al. |
| 5,025,372 A | 6/1991 | Burton et al. |
| 5,121,945 A | 6/1992 | Thomson et al. |
| 5,155,342 A | 10/1992 | Urano |
| 5,191,522 A | 3/1993 | Bosco et al. |
| 5,231,569 A | 7/1993 | Myatt et al. |
| 5,339,392 A | 8/1994 | Risberg et al. |
| 5,410,684 A | 4/1995 | Ainsworth et al. |
| 5,457,305 A | 10/1995 | Akel et al. |
| 5,465,206 A * | 11/1995 | Hilt et al. .................. 705/40 |
| 5,475,585 A | 12/1995 | Bush |
| 5,483,444 A | 1/1996 | Heintzman et al. |
| 5,483,445 A | 1/1996 | Pickering |
| 5,485,370 A | 1/1996 | Moss et al. |
| 5,500,513 A | 3/1996 | Langhans et al. |
| 5,513,102 A | 4/1996 | Auriemma |
| 5,530,232 A | 6/1996 | Taylor |

(Continued)

FOREIGN PATENT DOCUMENTS

EP 0540234 A2 5/1993

(Continued)

OTHER PUBLICATIONS

Electronic-device makers impose anti-consumer rules, Dan Gillmor. Knight Ridder Tribune News Service. Washington: Dec. 24, 2002. p. 1.*

(Continued)

*Primary Examiner* — Alexander Kalinowski
*Assistant Examiner* — Clement B Graham
(74) *Attorney, Agent, or Firm* — Kilpatrick Townsend & Stockton LLP

(57) ABSTRACT

Systems and methods for directing communications related to financial accounts. Some embodiments include systems that access account information maintained in relation to an account group. One or more communication rules are received from a user, applied to the account information, and communications are formed based on the application of the communication rules. Various methods provide for receiving communication rules, and applying the communication rules to account information to provide one or more communication outputs.

27 Claims, 8 Drawing Sheets

U.S. PATENT DOCUMENTS

| | | |
|---|---|---|
| 5,537,314 A | 7/1996 | Kanter |
| 5,546,523 A | 8/1996 | Gatto |
| 5,560,005 A | 9/1996 | Hoover |
| 5,590,038 A | 12/1996 | Pirtoda |
| 5,613,012 A | 3/1997 | Hoffman et al. |
| 5,614,703 A | 3/1997 | Martin et al. |
| 5,615,109 A | 3/1997 | Eder |
| 5,621,640 A | 4/1997 | Burke |
| 5,644,727 A | 7/1997 | Atkins |
| 5,648,906 A | 7/1997 | Amiripanahi |
| 5,649,117 A | 7/1997 | Landry |
| 5,649,118 A | 7/1997 | Carlisle et al. |
| 5,650,604 A | 7/1997 | Marcous et al. |
| 5,668,993 A | 9/1997 | Peters et al. |
| 5,684,965 A | 11/1997 | Pickering |
| 5,770,843 A | 6/1998 | Rose et al. |
| 5,774,870 A | 6/1998 | Storey |
| 5,783,808 A | 7/1998 | Josephson |
| 5,802,511 A | 9/1998 | Kouchi et al. |
| 5,819,263 A | 10/1998 | Bromley et al. |
| 5,826,243 A | 10/1998 | Musmanno et al. |
| 5,852,811 A | 12/1998 | Atikins |
| 5,859,419 A | 1/1999 | Wynn |
| 5,864,830 A | 1/1999 | Armetta et al. |
| 5,873,072 A | 2/1999 | Kight et al. |
| 5,875,437 A | 2/1999 | Atkins |
| 5,897,625 A | 4/1999 | Gustin et al. |
| 5,903,830 A | 5/1999 | Joao et al. |
| 5,914,472 A | 6/1999 | Foladare et al. |
| 5,920,847 A | 7/1999 | Kolling et al. |
| 5,937,391 A | 8/1999 | Ikeda et al. |
| 5,940,811 A | 8/1999 | Norris |
| 5,943,656 A | 8/1999 | Crooks et al. |
| 5,945,653 A | 8/1999 | Walker et al. |
| 5,953,710 A | 9/1999 | Fleming |
| 5,970,480 A | 10/1999 | Kalina |
| 5,978,780 A | 11/1999 | Watson |
| 5,984,180 A | 11/1999 | Albrecht |
| 5,991,736 A | 11/1999 | Ferguson et al. |
| 5,999,596 A | 12/1999 | Walker et al. |
| 5,999,624 A | 12/1999 | Hopkins |
| 6,009,415 A | 12/1999 | Shurling et al. |
| 6,012,048 A | 1/2000 | Gustin et al. |
| 6,018,718 A | 1/2000 | Walker et al. |
| 6,021,397 A * | 2/2000 | Jones et al. ............... 705/36 R |
| 6,021,943 A | 2/2000 | Chastain |
| 6,035,285 A | 3/2000 | Schlect et al. |
| 6,044,360 A | 3/2000 | Picciallo |
| 6,049,782 A | 4/2000 | Gottesman et al. |
| 6,061,660 A | 5/2000 | Eggleston et al. |
| 6,070,150 A * | 5/2000 | Remington et al. ............ 705/34 |
| 6,081,790 A | 6/2000 | Rosen |
| 6,092,055 A | 7/2000 | Owens et al. |
| 6,105,008 A | 8/2000 | Davis et al. |
| 6,108,641 A | 8/2000 | Kenna et al. |
| 6,119,109 A | 9/2000 | Muratani et al. |
| 6,128,599 A | 10/2000 | Walker et al. |
| 6,128,602 A | 10/2000 | Northington et al. |
| 6,128,603 A | 10/2000 | Dent et al. |
| 6,131,810 A | 10/2000 | Weiss et al. |
| 6,138,107 A | 10/2000 | Elgamal |
| 6,226,364 B1 | 5/2001 | O'Neil |
| 6,226,623 B1 | 5/2001 | Schein et al. |
| 6,260,024 B1 | 7/2001 | Shkedy |
| 6,273,816 B1 | 8/2001 | Bansal et al. |
| 6,289,318 B1 | 9/2001 | Barber |
| 6,292,789 B1 | 9/2001 | Schutzer |
| 6,304,860 B1 | 10/2001 | Martin, Jr. et al. |
| 6,311,170 B1 | 10/2001 | Embrey |
| 6,324,523 B1 | 11/2001 | Killeen et al. |
| 6,324,524 B1 | 11/2001 | Lent et al. |
| 6,327,573 B1 | 12/2001 | Walker et al. |
| 6,327,577 B1 | 12/2001 | Garrison et al. |
| 6,332,126 B1 | 12/2001 | Peirce et al. |
| 6,379,247 B1 | 4/2002 | Walker et al. |
| 6,401,079 B1 | 6/2002 | Kahn et al. |
| 6,405,181 B2 | 6/2002 | Lent et al. |
| 6,422,462 B1 | 7/2002 | Cohen |
| 6,549,912 B1 | 4/2003 | Chen |
| 6,607,136 B1 | 8/2003 | Atsmon et al. |
| 6,623,415 B2 | 9/2003 | Gates et al. |
| 6,636,833 B1 | 10/2003 | Flitcroft et al. |
| 6,661,217 B2 | 12/2003 | Kimball et al. |
| 6,764,013 B2 | 7/2004 | Ben-Aissa |
| 6,779,319 B2 | 8/2004 | Smith et al. |
| 6,802,500 B2 | 10/2004 | Bennett et al. |
| 6,829,588 B1 | 12/2004 | Stoutenburg et al. |
| 6,865,547 B1 | 3/2005 | Brake et al. |
| 6,925,441 B1 | 8/2005 | Jones et al. |
| 6,985,867 B1 | 1/2006 | Pryor et al. |
| 7,050,996 B1 | 5/2006 | Holm-Blagg et al. |
| 7,076,465 B1 | 7/2006 | Holm-Blagg et al. |
| 7,225,155 B1 | 5/2007 | Polk |
| 7,305,347 B1 | 12/2007 | Joao |
| 7,340,423 B1 | 3/2008 | Blagg et al. |
| 2001/0018679 A1 | 8/2001 | Lee |
| 2001/0032192 A1 | 10/2001 | Putta et al. |
| 2001/0034720 A1 | 10/2001 | Armes |
| 2001/0042785 A1 * | 11/2001 | Walker et al. ............... 235/379 |
| 2001/0051923 A1 | 12/2001 | Kosuda |
| 2002/0069122 A1 | 6/2002 | Yun et al. |
| 2002/0103746 A1 | 8/2002 | Moffett et al. |
| 2002/0123376 A1 | 9/2002 | Walker et al. |
| 2002/0123962 A1 | 9/2002 | Bryman et al. |
| 2002/0138424 A1 | 9/2002 | Coyle |
| 2002/0156723 A1 | 10/2002 | Lilly et al. |
| 2002/0198806 A1 | 12/2002 | Holm-Blagg et al. |
| 2003/0074311 A1 | 4/2003 | Saylors et al. |
| 2003/0083933 A1 | 5/2003 | McAlear |
| 2003/0115160 A1 | 6/2003 | Nowlin et al. |
| 2003/0120571 A1 | 6/2003 | Holm-Blagg |
| 2003/0135438 A1 | 7/2003 | Holm-Blagg et al. |
| 2003/0149660 A1 | 8/2003 | Canfield |
| 2003/0171992 A1 | 9/2003 | Holm-Blagg et al. |
| 2003/0182218 A1 | 9/2003 | Holm-Blagg |
| 2003/0212620 A1 | 11/2003 | Holm-Blagg |
| 2004/0030657 A1 | 2/2004 | Holm-Blagg et al. |
| 2004/0049452 A1 * | 3/2004 | Blagg ............................ 705/39 |
| 2004/0117302 A1 * | 6/2004 | Weichert et al. ............... 705/40 |
| 2004/0148239 A1 | 7/2004 | Albee et al. |
| 2004/0158532 A1 | 8/2004 | Breck et al. |
| 2005/0154664 A1 | 7/2005 | Guy et al. |

FOREIGN PATENT DOCUMENTS

| | | |
|---|---|---|
| EP | 0725376 | 8/1996 |
| WO | WO 97-43893 | 11/1997 |
| WO | WO 01-57709 | 8/2001 |

OTHER PUBLICATIONS

"Modular ATM Gives Boost to Diebold", Akron Beacon Journal, Jul. 12, 1997.

Air Miles Reward Program; "Terms and conditions of the Air Miles Reward Program"; May 1998.

"Virginia Bank Aims to Gain Accounts through Pact with Debit Card Issuer", American Banker v164 n93 p. 7, May 17, 1999.

Svaldi, Aldo "Debitlike card assists access to child-support aid." Denver, CO: Feb. 11, 2003, p. C.01 (3pages).

Western Union—First Data Corp. "Trans$Pay . . . soon to be the Western Union Pay Card", no date, 1 page.

Western Union—First Data Corp. FDX-400 Remote Payroll Distribution.

White, Ron "How Computers Work", 3rd Edition, Que Corporation, Sep. 1998.

U.S. Appl. No. 09/298,417, Office Action dated Mar. 27, 2002, 7 pages.

U.S. Appl. No. 09/298,417, Office Action dated Dec. 27, 2002, 8 pages.

U.S. Appl. No. 09/298,417, Office Action dated Jun. 9, 2003, 8 pages.

U.S. Appl. No. 09/298,417, Office Action dated Nov. 5, 2003, 7 pages.

U.S. Appl. No. 09/298,417, Notice of Appeal dated Jun. 27, 2003, 4 pages.

U.S. Appl. No. 09/298,417, Appeal Brief dated Jul. 1, 2003, 19 pages.

U.S. Appl. No. 09/298,417, Appeal Brief dated Feb. 5, 2004, 16 pages.
U.S. Appl. No. 09/298,505, Final Office Action dated Oct. 19, 2004, 5 pages.
U.S. Appl. No. 09/298,505, Final Office Action dated Jan. 23, 2002, 11 pages.
U.S. Appl. No. 09/298,505, Office Action dated May 22, 2001, 7 pages.
U.S. Appl. No. 11/187,605, Advisory Action dated Oct. 18, 2007, 3 pages.
U.S. Appl. No. 11/187,605, Final Office Action dated Aug. 2, 2007, 16 pages.
U.S. Appl. No. 11/187,605, Office Action dated Mar. 13, 2007, 15 pages.
U.S. Appl. No. 11/187,605, Final Office Action dated Nov. 30, 2006, 8 pages.
U.S. Appl. No. 11/187,605, Office Action dated Jun. 16, 2006, 5 pages.
U.S. Appl. No. 10/025,092, Final Office Action dated Oct. 18, 2007, 8 pages.
U.S. Appl. No. 10/025,092, Office Action dated May 4, 2007, 8 pages.
U.S. Appl. No. 10/371,852, Office Action dated Aug. 10, 2007, 7 pages.
U.S. Appl. No. 10/319,422, Advisory Action dated Nov. 30, 2007, 3 pages.
U.S. Appl. No. 10/319,422, Final Office Action dated Aug. 22, 2007, 11 pages.
U.S. Appl. No. 10/319,422, Office Action dated Mar. 8, 2007, 11 pages.
U.S. Appl. No. 10/373,637, Office Action dated Aug. 15, 2007, 23 pages.
U.S. Appl. No. 11/191,444, Office Action dated Oct. 18, 2007, 6 pages.
U.S. Appl. No. 11/191,444, Office Action dated Dec. 28, 2006, 8 pages.
U.S. Appl. No. 09/298,521, Ex Parte Quayle Action dated Jul. 25, 2007, 7 pages.
U.S. Appl. No. 09/298,521, Office Action dated Jun. 5, 2007, 6 pages.
U.S. Appl. No. 09/298,521, Appeal Brief dated Feb. 3, 2004, 25 pages.
U.S. Appl. No. 09/298,521, Office Action dated Nov. 3, 2003, 9 pages.
U.S. Appl. No. 09/298,521, Appeal Brief dated Jun. 25, 2003, 10 pages.
U.S. Appl. No. 09/298,521, Appeal Brief dated Aug. 15, 2002, 23 pages.
U.S. Appl. No. 09/298,521, Final Office Action dated Jul. 26, 2002, 7 pages.
U.S. Appl. No. 09/298,521, Office Action dated Nov. 27, 2001, 7 pages.
U.S. Appl. No. 09/298,521, Office Action dated May 30, 2001, 7 pages.
U.S. Appl. No. 10/205,482, Office Action dated Jul. 6, 2007, 13 pages.
U.S. Appl. No. 10/172,378, Final Office Action dated Nov. 9, 2007, 11 pages.
U.S. Appl. No. 10/172,378, Office Action dated Jun. 13, 2007, 11 pages.
U.S. Appl. No. 10/237,572, Examiner's Answer to Appeal Brief dated Aug. 10, 2007, 18 pages.
U.S. Appl. No. 10/237,572, Appeal Brief dated Jan. 2, 2007, 24 pages.
U.S. Appl. No. 10/237,572, Appeal Brief on Nov. 15, 2006, 24 pages.
U.S. Appl. No. 10/237,572, Office Action dated Aug. 15, 2006, 14 pages.
U.S. Appl. No. 10/237,572, Appeal Brief on Nov. 29, 2005, 22 pages.
U.S. Appl. No. 10/237,572, Appeal Brief dated Aug. 19, 2005, 20 pages.
U.S. Appl. No. 10/237,572, Appeal Brief dated Feb. 4, 2005, 19 pages.
U.S. Appl. No. 10/237,572, Advisory Action dated Nov. 30, 2004, 2 pages.
U.S. Appl. No. 10/237,572, Final Office Action dated Sep. 8, 2004, 18 pages.
U.S. Appl. No. 10/237,572, Office Action dated Mar. 25, 2004, 14 pages.
U.S. Appl. No. 11/187,605, Pre-Brief Appeal Conference Decision dated Dec. 18, 2008, 2 pages.
U.S. Appl. No. 11/187,605, Advisory Action dated Nov. 3, 2008, 3 pages.
U.S. Appl. No. 11/187,605, Final Office Action dated Jul. 8, 2008, 19 pages.
U.S. Appl. No. 11/187,605, Office Action dated Jan. 8, 2008, 17 pages.
U.S. Appl. No. 10/025,092, Pre-Brief Appeal Conference Decision dated Nov. 26, 2008, 2 pages.
U.S. Appl. No. 10/025,092, Advisory Action dated Oct. 20, 2008, 3 pages.
U.S. Appl. No. 10/025,092, Final Office Action dated Aug. 5, 2008, 9 pages.
U.S. Appl. No. 10/025,092, Office Action dated Apr. 3, 2008, 9 pages.
U.S. Appl. No. 10/025,092, Advisory Action dated Dec. 26, 2007 3 pages.
U.S. Appl. No. 10/371,852, Final Office Action dated May 1, 2008, 7 pages.
U.S. Appl. No. 10/371,852, Advisory Action dated Jul. 21, 2008, 2 pages.
U.S. Appl. No. 10/371,852, Office Action dated Dec. 1, 2008, 8 pages.
U.S. Appl. No. 10/319,422, Advisory Action dated Dec. 2, 2008, 3 pages.
U.S. Appl. No. 10/319,422, Final Office Action dated Sep. 17, 2008, 11 pages.
U.S. Appl. No. 10/319,422, Office Action dated Mar. 3, 2008, 12 pages.
U.S. Appl. No. 10/373,637, Final Office Action dated Dec. 22, 2008, 19 pages.
U.S. Appl. No. 10/373,637, Office Action dated Jul. 8, 2008, 22 pages.
U.S. Appl. No. 10/373,637, Advisory Action dated Apr. 1, 2008, 3 pages.
U.S. Appl. No. 10/373,637, Final Office Action dated Jan. 11, 2008, 24 pages.
U.S. Appl. No. 11/191,444, Office Action dated Feb. 9, 2009, 7 pages.
U.S. Appl. No. 11/191,444, Advisory Action dated Feb. 4, 2009, 3 pages.
U.S. Appl. No. 11/191,444, Final Office Action dated Sep. 5, 2008, 7 pages.
U.S. Appl. No. 11/191,444, Final Office Action dated Apr. 25, 2008, 7 pages.
U.S. Appl. No. 09/298,521, Notice of Allowance dated Oct. 3, 2007, 10 pages.
U.S. Appl. No. 10/205,482, Final Office Action dated Jan. 8, 2009, 14 pages.
U.S. Appl. No. 10/205,482, Advisory Action dated Jul. 15, 2008, 3 pages.
U.S. Appl. No. 10/205,482, Final Office Action dated Jan. 16, 2008, 13 pages.
U.S. Appl. No. 10/172,378, Office Action dated Feb. 19, 2009, 19 pages.
U.S. Appl. No. 10/172,378, Final Office Action dated Aug. 6, 2008, 18 pages.
U.S. Appl. No. 10/172,378, Final Office Action dated Oct. 21, 2008, 18 pages.
U.S. Appl. No. 10/172,378, Office Action dated Feb. 12, 2008, 11 pages.
U.S. Appl. No. 10/237,572, Examiner's Answer to Appeal Brief dated May 18, 2007, 17 pages.
U.S. Appl. No. 10/987,031, Office Action dated Jan. 25, 2008, 15 pages.
U.S. Appl. No. 10/987,031, Final Office Action dated Aug. 28, 2008, 18 pages.
U.S. Appl. No. 10/987,031, Advisory Action dated Dec. 8, 2008, 3 pages.

U.S. Appl. No. 10/386,027, Final Office Action dated Feb. 18, 2009, 11 pages.
U.S. Appl. No. 10/386,027, Advisory Action dated Oct. 31, 2008, 3 pages.
U.S. Appl. No. 10/386,027, Final Office Action dated Aug. 21, 2008, 10 pages.
U.S. Appl. No. 10/386,027, Office Action dated Feb. 14, 2008, 11 pages.
U.S. Appl. No. 11/533,041, Pre-Brief Appeal Conference Decision dated Dec. 16, 2008, 2 pages.
U.S. Appl. No. 11/533,041, Advisory Action dated Nov. 4, 2008, 3 pages.
U.S. Appl. No. 11/533,041, Final Office Action dated Aug. 7, 2008, 12 pages.
U.S. Appl. No. 11/533,041, Office Action dated Apr. 10, 2008, 10 pages.
U.S. Appl. No. 11/956,235, Final Office Action dated Feb. 24, 2009, 13 pages.
U.S. Appl. No. 11/956,235, Office Action dated Aug. 19, 2008, 11 pages.
U.S. Appl. No. 12/041,045, Office Action dated Dec. 24, 2008, 11 pages.

* cited by examiner

SYSTEMS AND METHODS FOR PARTICIPANT CONTROLLED COMMUNICATIONS REGARDING FINANCIAL ACCOUNTS

CROSS-REFERENCES TO RELATED APPLICATIONS

The present application is related to the following U.S. patent applications: U.S. patent application Ser. No. 10/025,092, entitled "Financial Transaction Account Usage Parameter Access and Control Method", and filed on Dec. 19, 2001 by Blagg et al.; U.S. patent application Ser. No. 09/298,505, entitled "Method for Linking Accounts Corresponding to Different Products Together to Create a Group", and filed on Apr. 23, 1999 by Blagg et al.; U.S. patent application Ser. No. 10/172,378, entitled "System and Methods for Accessing and Modifying Usage Parameters Associated with a Financial Transaction Account", and filed on Jun. 13, 2002 by Blagg et al.; U.S. patent application Ser. No. 09/298,417, entitled "Method for Processing a Group of Accounts Corresponding to Different Products", and filed on Apr. 23, 1999 by Blagg et al.; U.S. patent application Ser. No. 10/386,373, entitled "Pooling Rewards Associated With Accounts", and filed on Mar. 10, 2003 by Blagg et al.; U.S. patent application Ser. No. 10/386,027, entitled "Systems and Methods for Reward Pooling", and filed on Mar. 10, 2003 by Blagg et al.; U.S. patent application Ser. No. 10/371,852, entitled "Chasing Rewards Associated With Accounts", and filed on Feb. 21, 2003 by Blagg et al.; U.S. patent application Ser. No. 10/319,422, entitled "Authorizing Transactions Associated With Accounts", and filed on Dec. 12, 2002 by Blagg et al.; U.S. patent application Ser. No. 10/373,637, entitled "Systems and Methods for Authorizing Transactions", and filed on Feb. 24, 2003 by Blagg et al.; U.S. patent application Ser. No. 10/237,572, entitled "Multiple Credit Line Presentation Instrument", and filed on Sep. 9, 2002 by Blagg et al.; and U.S. patent application Ser. No. 09/298,521, entitled "Method for Defining a Relationship Between an Account and a Group", and filed on Apr. 23, 1999 by Blagg et al.; U.S. patent application Ser. No. 10/205,482, entitled "Systems and Methods for Non-Account Based Liability Reporting", and filed on Jul. 25, 2002 by Blagg et al. Each of the aforementioned applications is assigned to an entity common hereto, and is incorporated herein by reference for all purposes.

BACKGROUND OF THE INVENTION

The present invention is related to financial account maintenance, and in particular to systems and methods for allowing consumer control of financial account communications.

Communications from financial institutions are directed to customers maintaining financial accounts with such institutions. These communications are often in the form of letters, and are typically formatted to match the needs of the institution providing the communication. As such, the communications are created to meet the needs of a generalized portion of the bank's customer base. However, such communications are often considered insufficient by various of the customers.

Further, such communications are often created for each account held by the customer. This can result in confusion to the customer and significant expense to the bank providing the communications. Accordingly, there exists a need to address these and other limitations.

BRIEF SUMMARY OF THE INVENTION

The present invention is related to financial account maintenance, and in particular to systems and methods for allowing consumer control of financial account communications.

Some embodiments of the present invention provide an interface through which the consumer can identify an account group and/or an account, and can provide communication rules to be used in relation to the account group and/or account. Thus, for example, the consumer may be associated with an account group that includes three accounts—two for which the consumer is primarily liable, and another that the consumer is responsible for monitoring. The consumer can provide one or more communication rules that are maintained in a communication rule set. The communication rule set is applied to information associated with the three accounts, and based on the application of the communication rule set, the consumer can be provided with a comprehensive communication about the three accounts. This can avoid the situation where the consumer receives an individual communication associated with each of the three accounts, and then has to merge the information into a cohesive summary about the status of the various accounts.

Other examples can regard communication at the group level such as, for example, when to consolidate information associated with the group into a common communication, and/or when not to consolidate. Alternatively, or in addition, communication can indicate which information is to be reported in relation to a single account, and which information is not to be reported. This can include the use of thresholds. As one particular example, a communication may be generated to one particular participant indicating that a percentage of the credit limit of a financial account has been exhausted. Otherwise, where the threshold is not met, this participant may not receive any communications in relation to the account. Based on this disclosure, one of ordinary skill in the art will recognize other thresholds that can be used.

In some cases, a communication rule provided by the consumer can direct merging of multiple communications. Such a merge communication rule can cause all communications destined for the consumer to be merged into a single communication. In other cases, such a merge communication rule can be applied by an account processor without any direction from the consumer. This can save the account processor significant costs that would have otherwise been spent for postage and/or printing of multiple account communications. As yet another example, the communication rule may indicate that mergers of communications normally performed by an account processor should not be performed. Yet further, a communication rule may indicate that no communications of a certain type are to be sent. This would effectively block communications that a participant did not desire.

In other cases, a communication rule provided by the consumer may indicate a special message for some participant, member of an account group, and/or combination thereof. Thus, for example, where the consumer is a parent who is jointly liable on a child's account, the parent may desire to place an additional message on the child's statement. The parent may want to place a message indicating that if the account is not brought current immediately, the account will be closed. This allows the parent to address a child's overdrawn account in the name of the account issuer. To avoid potential legal detriment to the account issuer by messages included by the parent, the parent may be directed to select a canned message approved by the account issuer.

Alternatively, or in addition, the parent may choose to eliminate a message that would otherwise be included by the issuer, or limit the severity of such a message. This is particularly advantageous where the parent is a guarantor of the account and/or is liable for satisfaction of the account either in addition to the child, or in place of the child. Thus, for example, the parent may not want the delinquency of the account brought to the attention of the child because of existing pressures on the child. Where the parent is liable for the account, the parent can remove any derogatory statements that the account issuer may otherwise make.

As another example, where a parent and a child are jointly responsible for an account, the parent may request information about the account usage by the child including spending patterns. From this information, the parent can select an appropriate message to address the child's spending habits. The message is then included with the statement sent by the issuer to the child.

As yet another example, a child monitoring a parent's account while the parents are away can place a message in a letter sent from the issuer to the parent. Such a message could say, for example, "we hope things are going well, that the account payments will be made, and that there is nothing to worry about." Thus, the bank can provide all communication to the parent under direction of the group owner. Again, a set of canned messages can be selected from, in order to limit potential liability by the issuer.

Alternatively, or in addition, custom messages from one participant from another can be accepted and provided with a particular correspondence. In some cases, these can be placed in a specially designated area of a correspondence that indicates that the message is from another participant, and not the responsibility of the issuer or processor providing the correspondence. This can alleviate any potential that the issuer or processor would be found to be liable for the content of the message. As an example, when a credit limit threshold is exceeded, a message provided from one participant saying "your balance is getting kinda high" could be placed in an area labeled "message from mom". Based on this disclosure, one of ordinary skill in the art will appreciate a number of messages, canned or custom, that can be included.

As another example, a communication rule may indicate a reminder to be sent from participants to themselves. Thus, for example, on a three month interval, a credit card statement provided to the participant may include a reminder to obtain an oil change. Based on this disclosure, one of ordinary skill in the art will recognize a number of potential messages that can be set to participants within or outside of a given group. As yet another example, the message can be provided in relation to a reward program. Thus, where an account accrues an amount for purchasing a car, the car manufacturer providing the reward can send reminders about automobile maintenance. Thus, a participant can be a third party, such as a reward partner in the previous example. In some cases, this can include an opt in selection where the account owner, or some other consumer participant elects to have updates provided from the third party participant.

In various embodiments of the present invention, a consumer may be provided with a means for directing communications related to various financial accounts. Such a consumer may be a member of an account group that associates two or more accounts. In some cases, the two or more accounts are the same type of accounts, such as credit card accounts, while in other cases, the two or more accounts are associated with different financial products. For example, the two or more accounts can include, but are not limited to, asset accounts and liability accounts. Asset accounts can include, but are not limited to, savings accounts, stock accounts, money market accounts, and the like. Liability accounts can include, but are not limited to, credit card accounts, retail revolving credit accounts, loan accounts, large item credit accounts, and the like.

Various embodiments of the present invention provide systems for implementing consumer based communication rules in relation to one or more financial accounts. Such systems include a microprocessor based rule engine that is associated with a computer readable medium. The computer readable medium includes instructions executable by the microprocessor based rule engine to receive a trigger that indicates a correspondence associated with the financial account. Such a trigger can be, but is not limited to, a date on which a statement is to be sent, a request from a customer for account information, and/or the like. Further, the instructions are executable to receive a communication rule from a participant associated with the financial account. Such a participant can be anyone authorized to interact in relation to the financial account. Thus, for example, a participant can be an account owner, an account custodian, or someone authorized thereby. The received communication rule can be incorporated into a communication rule set maintained on the computer readable medium, and information associated with the financial account can be accessed and the communication rule set applied to the information. The correspondence can then be based in part on the application of the communication rule set.

In particular cases, the financial account is part of an account group, the communication rule is directed to a set of financial accounts from the account group, and the set of financial accounts is selected from a group consisting of: all accounts within the account group, a subset of accounts within the account group, and a single account within the account group. An output can be provided that is directed to one or more members associated with the account group. This output can be the aforementioned correspondence, or some other message, insert, or the like associated with the correspondence. Thus, this output can be in electronic form or physical form. Examples can include, but are not limited to, a paper letter, an insert, a presentation instrument carrier, and a message placed on a statement.

In various cases, the previously discussed participant is a first participant, and at least one other participant. This other participant need not be authorized to access the financial account, but rather can be any potential recipient of a communication. In such cases, the instructions can be further executable by the microprocessor based rule engine to provide an output directed to the other participant. Such a message can be selected from a set of canned messages, or provided directly from a participant desiring to send a particular message.

Other embodiments of the present invention provide methods for implementing consumer based communication rules in relation to an account group. The methods include receiving an indication of a financial account that identifies a participant associated with the financial account. The methods further include providing a communication rules interface to the participant over a communication network, and receiving a communication rule via the communication rules interface. Further, a trigger is received that indicates a correspondence associated with the financial account. The communication rule is applied to information associated with a financial account, and a correspondence is created that is based at least in part on the application of the communication rule.

Some embodiments of the present invention provide systems for implementing consumer based communication rules in relation to a plurality of financial accounts. The systems include an account group composed of two or more financial accounts, a microprocessor based rule engine, and a computer readable medium. The computer readable medium includes instructions executable by the microprocessor based rule engine to: receive a communication rule from a member associated with the account group; incorporate the rule into a communication rule set maintained on the computer readable medium; access information associated with the first and second financial accounts; and apply the communication rule set to the information associated with the first financial account and the information associated with the second financial account.

In some cases, additional instructions are included that are executable to provide an output directed to one or more members associated with the account group. Such an output is created based at least in part upon application of the communication rule set. The output can be an electronic communication such as, for example, an email, a customer accessible webpage, and/or the like. Alternatively, or in addition, the output can be a paper letter deliverable by, for example, a physical mail delivery system.

In one particular case, two or more members are associated with the account group, and the communication rule is received from one of the members, while the output is directed to the other member. The instructions are further executable by the microprocessor based rule engine to: provide a set of canned messages, receive an indication of one or more of the canned messages for inclusion in the output, and incorporate the canned message into the output. In some instances one of the members is senior to the other member, while in other instances the members share the same seniority. In particular cases, seniority can be an indication of liability where a senior member may be jointly liable or completely liable for a junior member's account balances. In other cases seniority can indicate a key account verses a dependent account, where a senior member may be associated with a key account, while the junior holder is associated with a dependent account. Based on this disclosure, one of ordinary skill in the art will recognize other junior/senior relationships that are applicable to the embodiments of the present invention. Further information about the relationship of key accounts to dependent accounts is found in U.S. patent application Ser. No. 09/298,521, entitled "Method for Defining a Relationship Between an Account and a Group", and filed on Apr. 23, 1999 by Blagg et al. The aforementioned patent application was previously incorporated herein by reference for all purposes. In some cases, one of the financial accounts associated with the account group is a liability account, and another of the financial accounts is an asset account.

The communication rule can direct the consolidation of data or other attributes of two or more accounts associated with the account group. Alternatively, or in addition, the communication rule can direct production of a single letter merging information from two or more of the financial accounts. In particular cases, the two or more accounts are associated with different financial products. As one example, one of the accounts may be associated with a credit card, while another of the accounts is associated with one of the following financial products: a savings account, a checking account, a money market account, a loan account, and a retail revolving credit account.

Other embodiments of the present invention provide methods for implementing consumer based communication rules in relation to an account group. The methods include receiving an indication of an account group. Such an account group can associate two or more financial accounts. The methods further include providing a communication rules interface to a member associated with the account group over a communication network, and receiving a communication rule via the communication rules interface. Information associated with two or more financial accounts within the account group is accessed, and the communication rule is applied to the information. In some cases, the methods further include generating an output directed to one or more members associated with the account group, wherein the output is based at least in part on the application of the communication rule to the information associated with the financial accounts.

The inventions of the present invention can be valued by consumers such that they command a premium, and can support a fee structure. Thus, an addition mechanism for allowing a participant to pay for additional and/or reduced disclosure in relation to an account can be provided. One of ordinary skill in the art will appreciate a number of fee structures that can be implemented.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
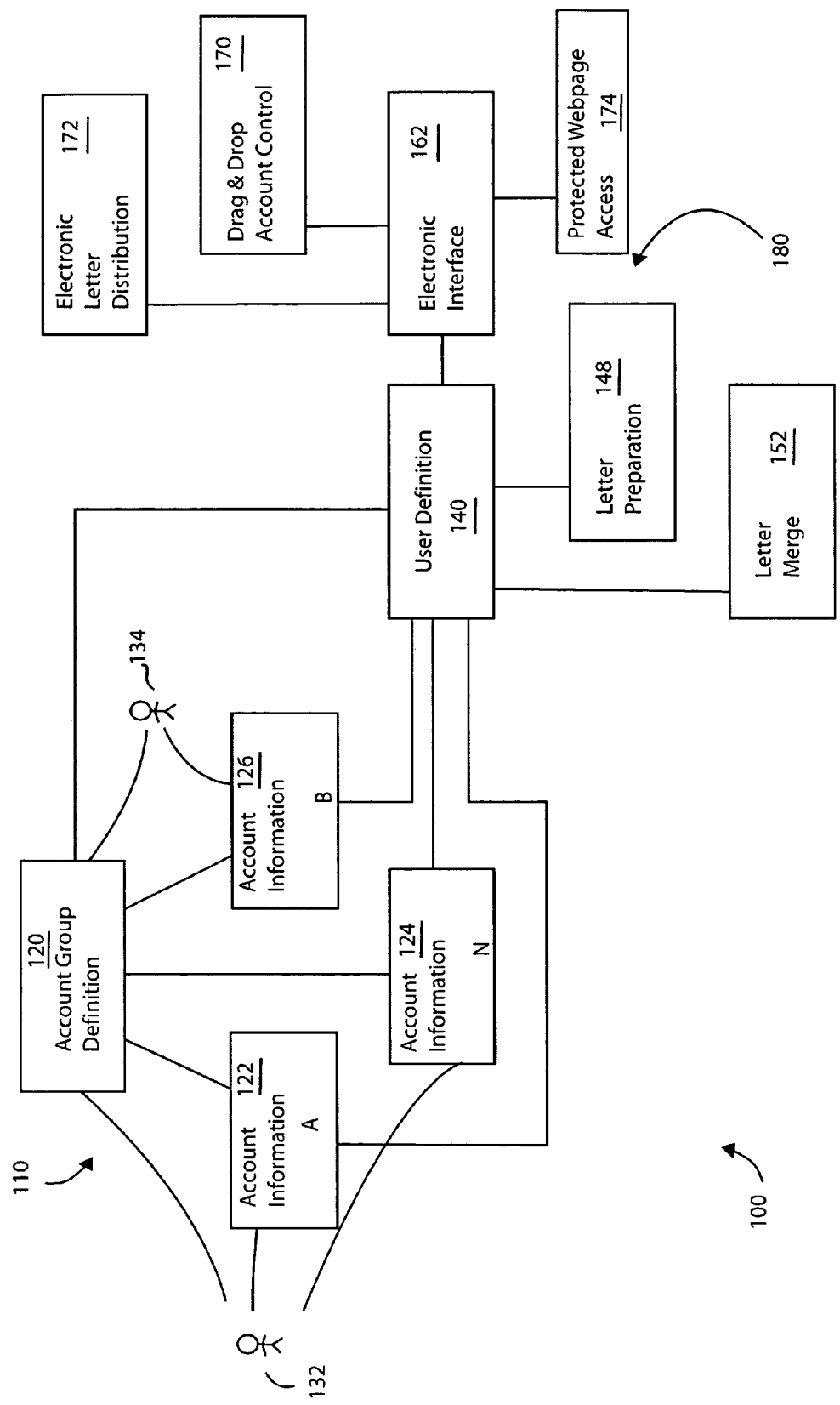
FIG. 1 illustrates a system in accordance with some embodiments of the present invention for controlling communications in relation to an account group.

The present invention is related to financial account maintenance, and in particular to systems and methods for allowing consumer control of financial account communications.

In some cases, a consumer may utilize systems and methods of the present invention to access one or more financial accounts to provide rules that govern the production and/or direction of communications associated with the accounts. In some cases, the consumer may be a member of an account group that associates two or more accounts. In such cases, the systems and methods of the present invention can work in conjunction with the account group to provide communication rules useful in relation to the account group. As used herein, a financial account is any account associated with a financial product and/or maintained in relation to a financial establishment. Such financial accounts can be liability accounts or asset accounts. Asset accounts can include, but are not limited to, savings accounts, stock accounts, money market accounts, and the like. Liability accounts can include, but are not limited to, credit card accounts, retail revolving credit accounts, loan accounts, large item credit accounts, and the like.

In some cases, the systems and methods of the present invention can operate on two or more accounts that are associated with different financial products. For example, the systems and methods of the present invention can operate on an account associated with a credit card simultaneously with a savings account maintained by a bank. Alternatively, the systems and methods can operate on a number of accounts associated with the same financial product types.

Some embodiments of the present invention provide an interface through which the consumer can identify an account group and/or an account, and can provide communication rules to be used in relation to the account group and/or account. Thus, for example, the consumer may be associated with an account group that includes three accounts—two for which the consumer is primarily liable, and another that the consumer is responsible for monitoring. The consumer can provide one or more communication rules that are maintained in a communication rule set. The communication rule set is applied to information associated with the three accounts, and based on the application of the communication rule set, the consumer can be provided with a comprehensive communication about the three accounts. This can avoid the situation where the consumer receives an individual communication associated with each of the three accounts, and then has to merge the information into a cohesive statement about the status of the various accounts.

In some cases, a communication rule provided by the consumer can request a merge of communications. Such a rule can cause all communications destined for the consumer or to another associated with the consumer to be merged into a single communication. In various embodiments, such a merge communication rule may be applied by an account processor. This can save the account processor significant costs that would have otherwise been spent of postage and/or printing of multiple account communications.

In other cases, a communication rule provided by the consumer may indicate a special message for some members of the group. Thus, for example, where the consumer is a parent who is jointly liable on a child's account, the parent may desire to place an additional message on the child's statement. The parent may want to place a message indicating that if the account is not brought current immediately, the account will be closed. This allows the parent to address a child's overdrawn account in the name of the account issuer. To avoid potential legal detriment to the account issuer by messages included by the parent, the parent may be directed to select a canned message approved by the account issuer.

Alternatively, or in addition, the parent may choose to eliminate a message that would otherwise be included by the issuer. This is particularly advantageous where the parent is a guarantor of the account and/or is liable for satisfaction of the account either in addition to the child, or in place of the child. Thus, for example, the parent may not want the delinquency of the account brought to the attention of the child because of existing pressures on the child. Where the parent is liable for the account, the parent can remove any derogatory statements that the account issuer may otherwise make.

As another example, where a parent and a child are jointly responsible for an account, the parent may request information about the account usage by the child including spending patterns. From this information, the parent can select an appropriate message to address the child's spending habits. The message is then included with the statement sent by the issuer to the child.

As yet another example, a child monitoring a parent's account while the parents are away can place a statement in a letter sent from the bank to the parent stating that, for example, they "hope things are going well, that the account payments will be made, and that there is nothing to worry about." Thus, the bank provides all communication to the parent under direction of the account group owner.

FIG. 1 depicts a system 100 in accordance with some embodiments of the present invention for controlling communications in relation to an account group 110. As illustrated, account group 110 includes an account group definition 120 that defines the relationship of a plurality of accounts that are comprised of account information 122, 124, 126. In some cases, account information 122, 124, 126 are associated with different group members 132, 134. Thus, for example, members 132, 134 may be identified by account group definition 120 as owners of the respective accounts. As one specific example, member 132 may be a parent, while member 134 is a child. The parent may be exclusively liable for accounts described by account information 122, 124, and jointly liable with the child for the account described by account information 126. As another example, member 132 may be the child, and member 134 may be an elderly parent. In such a case, the child may not have any liability for the account described by account information 126, but rather may only have oversight responsibility for the account. Based on the disclosure provided herein, one of ordinary skill in the art will appreciate a number of other account groupings that are possible, including relationships between various members in the account group, as well as various different financial products that can be associated with the accounts in account group 110. Account group definition 120 and account information 122, 124, 126 are maintained on a database, or some other types of computer readable media.

Further examples and discussion of account groups is provided in U.S. patent application Ser. No. 09/298,417, entitled "Method for Processing a Group of Accounts Corresponding to Different Products", and filed on Apr. 23, 1999 by Blagg et al.; U.S. patent application Ser. No. 10/025,092, entitled "Financial Transaction Account Usage Parameter Access and Control Method", and filed on Dec. 19, 2001 by Blagg et al.; U.S. patent application Ser. No. 09/298,505, entitled "Method for Linking Accounts Corresponding to Different Products Together to Create a Group", and filed on Apr. 23, 1999 by Blagg et al.; U.S. patent application Ser. No. 09/298,521, entitled "Method for Defining a Relationship Between an Account and a Group", and filed on Apr. 23, 1999 by Blagg et al.; U.S. patent application Ser. No. 10/205,482, entitled "Systems and Methods for Non-Account Based Liability Reporting", and filed on Jul. 25, 2002 by Blagg et al.; U.S. patent application Ser. No. 10/172,378, entitled "System and Methods for Accessing and Modifying Usage Parameters Associated with a Financial Transaction Account", and filed on Jun. 13, 2002 by Blagg et al.; U.S. patent application Ser. No. 10/172,378, entitled "System and Methods for Accessing and Modifying Usage Parameters Associated with a Financial Transaction Account", and filed on Jun. 13, 2002 by Blagg et al. Each of the aforementioned applications is assigned to an entity common hereto, and was previously incorporated herein by reference for all purposes.

System 100 also includes an output production system 180. Output production system 180 includes a user definition engine 140 that is capable of accessing account group definition 120, and account information 122, 124, 126 associated with account group 110. User definition engine 140 includes a communication rule set that directs the production of communication materials, or output, by output production system 180. This communication rule set can be maintained on a database associated with user definition engine 140, and is accessible and/or executable by a processing engine associated with user definition engine 140. In one particular case, user definition engine 140 includes a microprocessor based device, such as a personal computer, that is communicably coupled to a hard disk drive that maintains the communication rule set.

As just one example, communication rule set may indicate that a statement related to the account defined by account information 126 is to be provided to both member 132 and member 134. As another example, the aforementioned communication rule set may control production of a communication related to account information 126 and directed to member 134 to include one level of information, and another communication about the same account directed to member 132 to include a different level of communication. Further, the communication(s) directed to member 132 may be electronic communications, while the communications directed to member 134 may be in the form of a letter. Based on the disclosure provided herein, one of ordinary skill in the art will appreciate the vast array of communication rules that can be defined by a consumer to control communications prepared in relation to financial accounts accessible to the consumer.

In some cases, the output is a letter to one or more members associated with account group 110. Such a letter can be prepared by automatic letter preparation equipment 148 as is known in the art. In particular cases, multiple letters destined for the same consumer can be detected by a letter merge engine 152. Merge engine 152 can merge the multiple letters into a single letter representing all of the accounts from which the merged information is obtained. This can save both postage expenses of the issuer sending the letters, as well as time of a consumer that no longer is required to sort through multiple letters to access the account information. In some embodiments, merge engine 152 operates on a fixed time window. When a member is identified to receive a communication, merge engine 152 looks into the future for a duration equal to the time window and seeks to identify other communications that are to be directed to the same member. Where a future communication is identified, it is determined whether the identified communications can be merged and sent on a common distribution date. Where a common distribution date is fixed, merge engine 152 stores a pointer for the identified letters, and on the common distribution date, merge engine 152 merges the identified letters and forwards the merged letter to letter preparation system 148.

In various cases, the common distribution date falls somewhere between previously fixed distribution dates for the identified letters, while in other cases, the common distribution date is the same as a previously fixed distribution date for one of the letters. Setting the common distribution date can involve considering a variety of factors including, but not limited to, the settlement date for an account to which one or more of the identified letters is associated, the time sensitivity of information in a given letter, and/or the like. In some cases a common distribution date is not achievable, and the letters are prepared and sent individually.

In various cases the output is an electronic communication to one or more members associated with account group 110. Thus, where the communication rule set maintained by user definition engine 140 calls for account information 122, 124, 126 to be communicated electronically, the information is passed to electronic interface 162. Based on the communication rule set, the information can be disseminated as an email by electronic letter distribution engine 172, provided by a webpage engine 174 as a text message at a password protected webpage accessible to the member to which it is directed, and/or provided by another webpage engine 170 as a mixed media interface accessible by the member to which the information is directed. In particular embodiments, the mixed media interface can include a drag and drop feature for moving assets between various accounts within account group 110. Where applicable, a merge engine similar to that described above in relation to paper letters can be used to merge multiple electronic communications.

Figure 2:
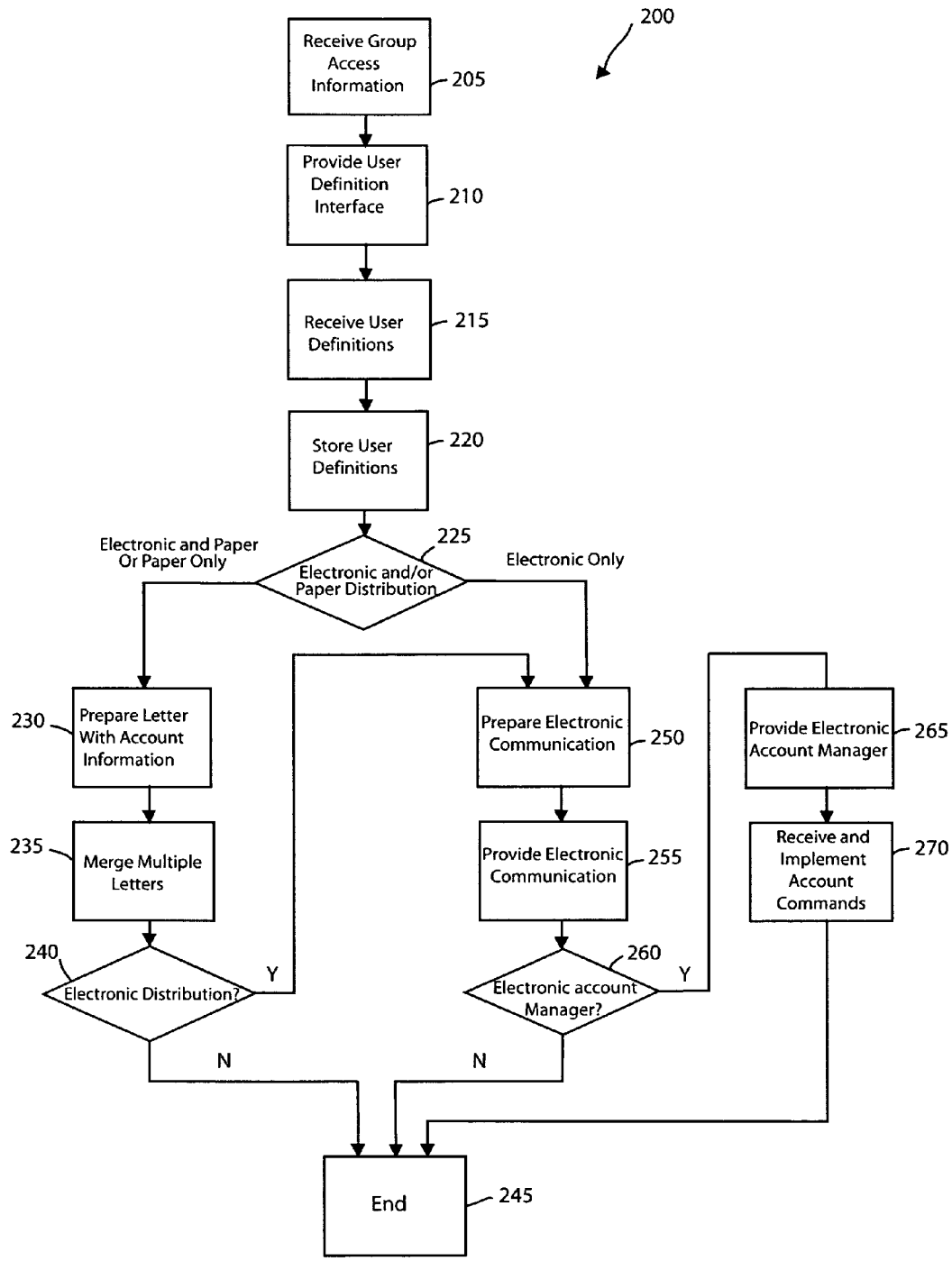
FIG. 2 is a flow diagram illustrating a method in accordance with various embodiments of the present invention for controlling communications in relation to an account group.
Figure 3:
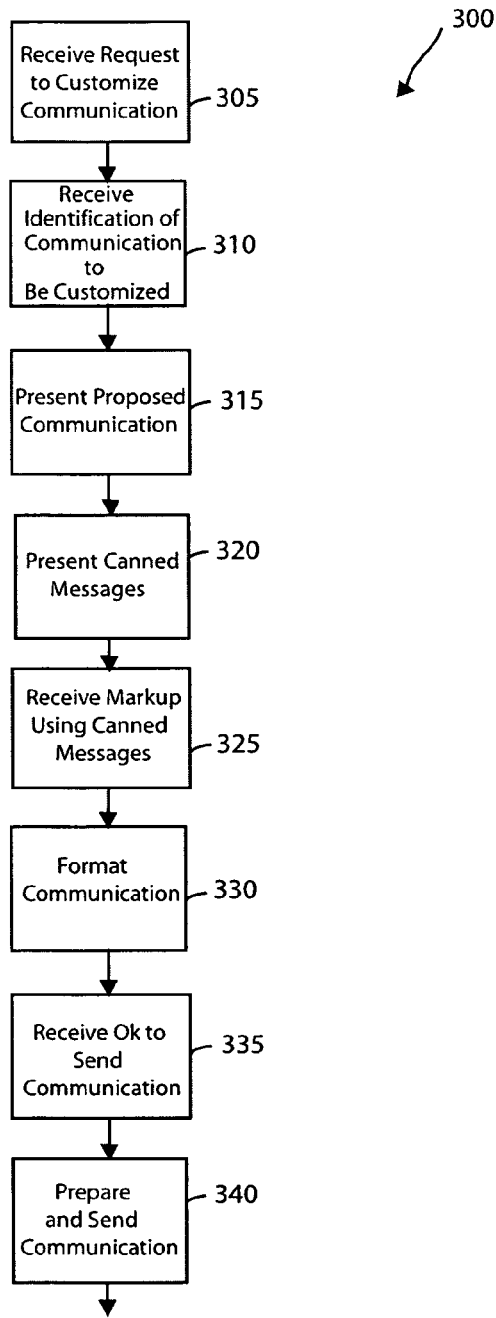
FIG. 3 is an exemplary communication formed using the system and method of FIGS. 1 and 2.

Turning to FIG. 2, a flow diagram 200 illustrates a method in accordance with some embodiments of the present invention for accepting and implementing communication rules. Following flow diagram 200, group access information is received (block 205). This group access information can indicate an account group with which the requestor (who can be an account group member) is related. Once the account group is identified, the requestor is presented with a user definition interface (block 210). Such a user definition interface can be, for example, a webpage that identifies various accounts associated with the account group, and facilitates the identification and/or entry of communication rules to be used in relation to the accounts. The requestor creates and/or selects various communication rules to be applied, and the selections are transferred to user definition engine 140 where they are stored (blocks 215, 220).

It is determined whether electronic communications, letter communications, or letter and electronic communications are designated by the communication rules (block 225). Where either electronic communications and letter communications, or letter only communications are desired (block 225), a letter including information about the reported account is generated in an electronic format (block 230). The generated letter is compared to other letters within a defined time window, and any matching letters are merged with the generated letter as discussed above (block 235). Where no electronic distribution is desired (block 240), the process ends (block 245).

Alternatively, where electronic communications are to be provided (block 240), or where only electronic communications were to be generated (block 225), the proper electronic communication can be generated for the particular account (block 250). This electronic communication can be in the form of an email, a webpage, or the like. Once generated, the electronic communication can be provided to one or more members of the account group (block 255). Distribution of the electronic communication to the member can be by way of email where the email either includes a text message forming the communication, or a combination of text, graphics, video and/or sound. Alternatively, the communication can be posted at a webpage known to the members, or the members can additionally receive an email directing them to the webpage.

It is also determined if the requester desires to manipulate the various accounts associated with the account group via an electronic account manager (block 260). As used herein, an electronic account manager can be any electronic interface that allows an entity to modify the status of an account, communication rules associated with the account, the status of the account, and/or the like. Two examples of electronic account managers are discussed below in relation to FIGS. 3 through 6.

Whether a consumer is presented with such an electronic account manager can be controlled by the various communication rules maintained in user definition engine 140, or whether the consumer requested it via a webpage as is known in the art. Where the electronic account manager is requested, an interface to the electronic account manager is provided to the requestor (block 265). Various commands, such as modifications, deletions, and/or additions to the communication rule set can be received via the electronic account manager and implemented under the direction of user definition engine 140 (block 270). Other examples of information that can be received via the electronic account manager are directions to transfer funds between various accounts. Based on the disclosure provided herein, one of ordinary skill in the art will appreciate a number of other information that can be received via electronic account managers.

As previously discussed, one type of electronic account manager can be created to accept communication rules from consumers. Such communication rules can be tailored to implement custom modifications to standard communications. The operation of such an electronic account manager is depicted in a flow diagram 300 of FIG. 3, and a user interface 400 of FIG. 4. Following flow diagram 300, a request to customize a communication is received (block 305). Such a communication can be, for example, a balance statement associated with an account, a delinquency letter associated with an account, or the like. The request identifies the particular communication to be customized (block 310). Such identification can include identifying the account the communication is associated with along with the name of the member to whom the communication is addressed. A standard, or proposed version of the communication is presented to the requestor via an electronic interface (block 315). In addition to the proposed communication, various canned messages can be presented as possible insertions into the proposed message (block 320).

Figure 4:
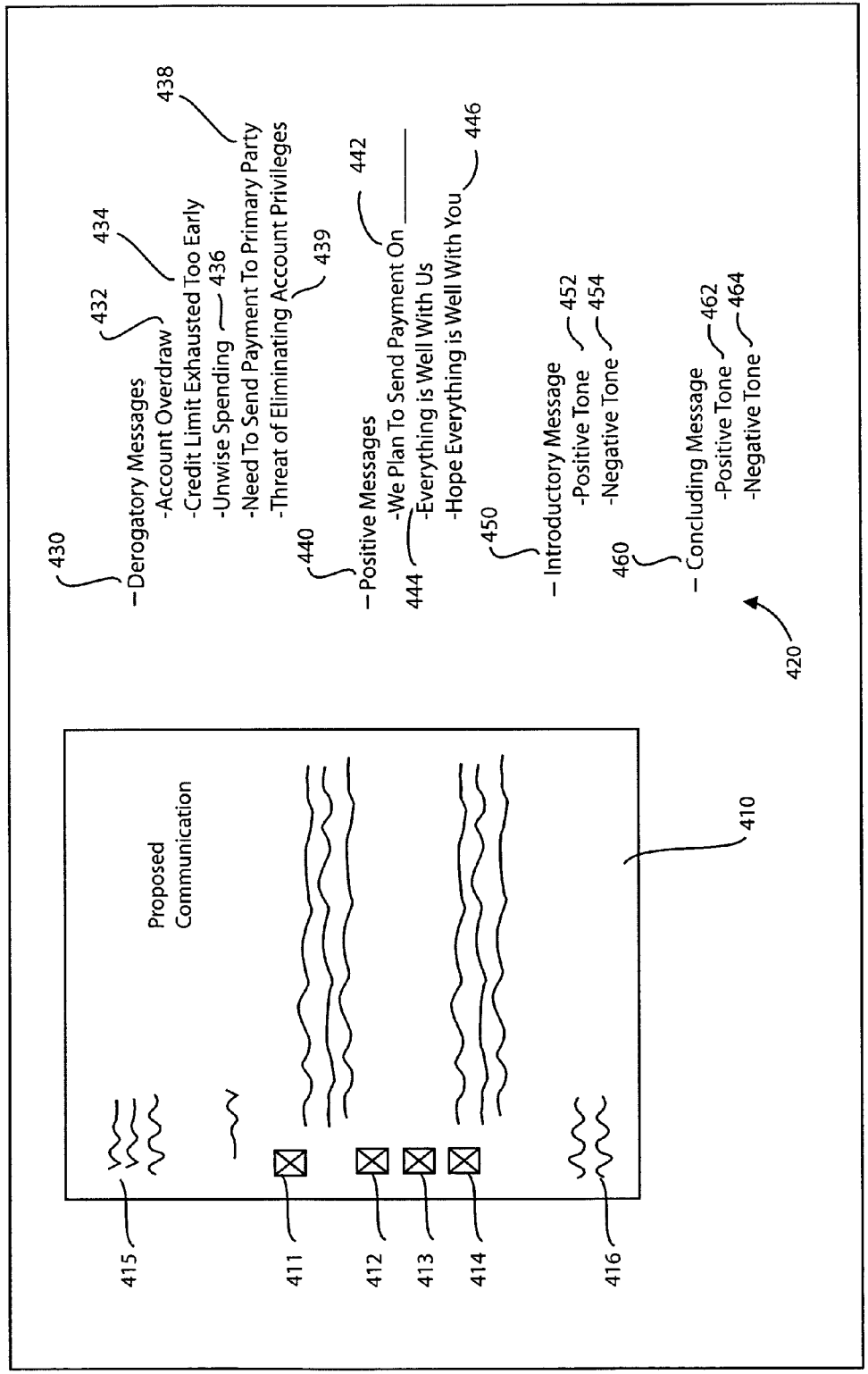
FIG. 4 depicts a user interface in accordance with some embodiments of the present invention.

In some cases, the proposed communication is presented to the requestor via an electronic interface such as user interface 400 depicted in FIG. 4. As depicted, user interface 400 includes proposed communication 410 that can include a number of paragraphs of text 411, 414, as well as, addressee information 415, and a signature block 416. In addition, various place holders 412, 413 indicate locations where additional text can be added to proposed communication 410.

Also included as part of user interface 400 are a number of canned messages 420 arranged in a hierarchical structure. The messages can include, but are not limited to, derogatory messages 430, positive messages 440, introductory messages 450, and concluding messages 460. Derogatory messages 430 can include, but are not limited to, account overdrawn messages 432, credit limit exhausted to early messages 434, unwise spending messages 436, directions to send payment directly to the other liable party on the account 438, and/or threats indicating that the account may be discontinued 439. Based on this disclosure, one of ordinary skill in the art will recognize a number of derogatory messages that could be used in relation to embodiments of the present invention. For example, another message may indicate account delinquency.

Positive messages 440 can include, but are not limited to, a message telling another member that payment on the account will be made by a date certain 442, a message indicating that everything is going well for the member 444, and/or a message indicating a hope that everything is well for the recipient of the communication 446. Again, based on the disclosure provided herein, one of ordinary skill in the art will recognize other positive messages that can be used in relation to the present invention. Introductory messages 450 and concluding messages 460 can be included with either a positive tone 452, 462, respectively, or with a negative tone 454, 464, respectively. Again, based on the disclosure provided herein, one of ordinary skill in the art will recognize various introductory and concluding messages that can be used in relation to the present invention.

Returning to FIG. 3, the canned messages selected by the user and the locations of the canned messages within proposed communication 410 are received (block 325). In addition, this may include deletion of some of the paragraphs initially included in proposed communication 410. This markup information is used to format proposed communication (block 330), and to display proposed communication 410 as it will appear to the user. The user then authorizes proposed communication 410 (block 335), and proposed communication 410 as formatted is prepared and sent to the intended recipient (block 340).

One advantage of such systems and methods is the ability to allow customization of communications, while assuring some level of control over the content of such communications. Such control is helpful where the issuer sending the communication could find itself liable for information added to the communication by the user.

In other embodiments, more limited control over the content of such communications can include a mandatory disclaimer associated with a free form custom message. Such control can provide flexible communication with some level of liability protection. In still other embodiments, a reviewing authority can determine whether various custom content added by the user is included in the communication.

Figure 5:
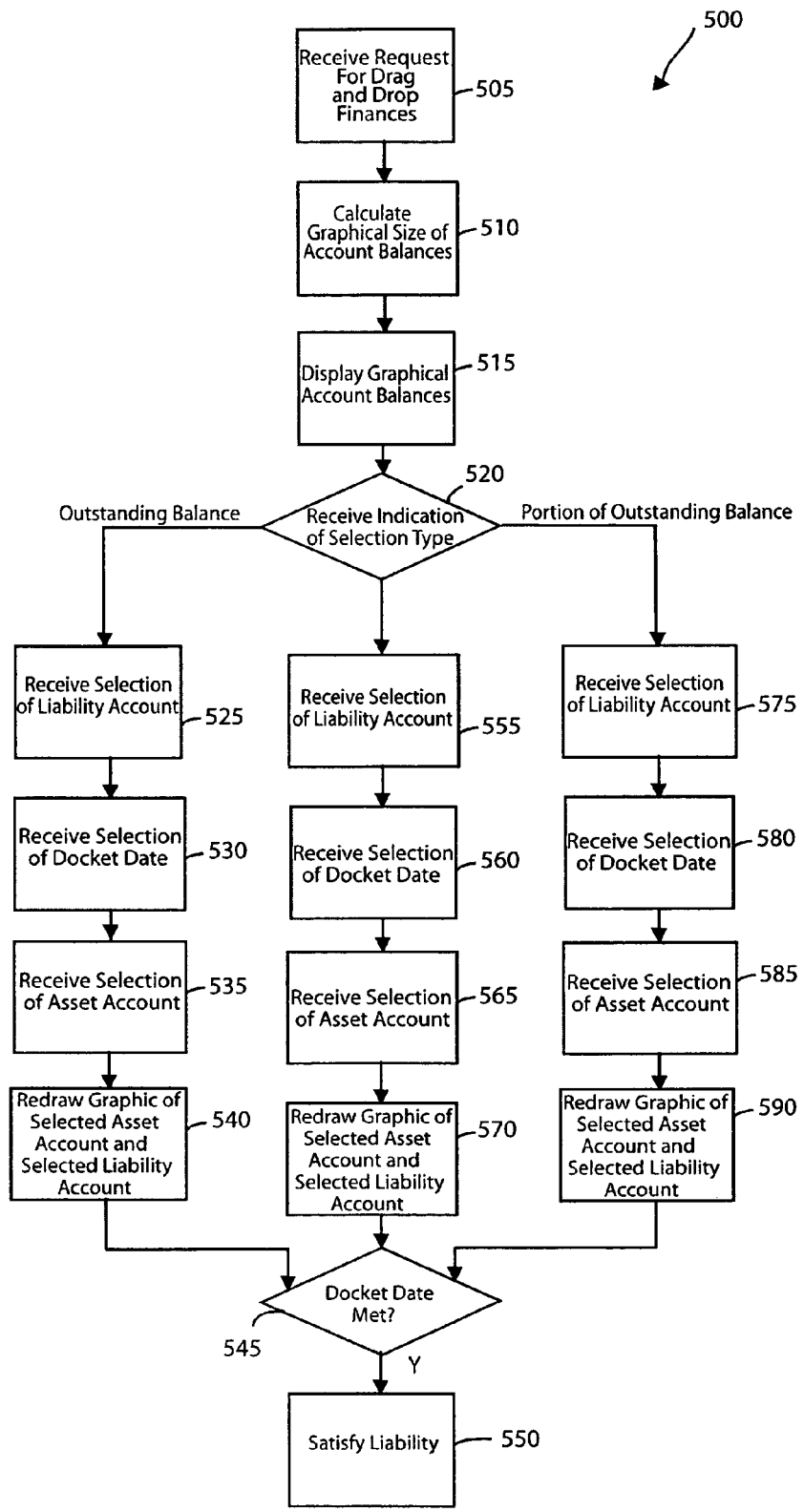
FIG. 5 is a flow diagram illustrating a method in accordance with various embodiments of the present invention.

Turning now to FIGS. 5 and 6, a flow diagram 500 and a user interface 600 illustrates another method that can be accomplished via an electronic account manager. Following flow diagram 500, a user can request access to a drag and drop finances user interface (block 505). The account balances associated with various asset and liability accounts can be calculated and matched to a graphical area representing the magnitude of the balance (block 510). In addition, balance due portions of outstanding liability balances can be calculated and matched to a graphical area. These proportional sizes are presented to the user via a graphical user interface, such as that depicted in FIG. 6 (block 515).

Figure 6A:
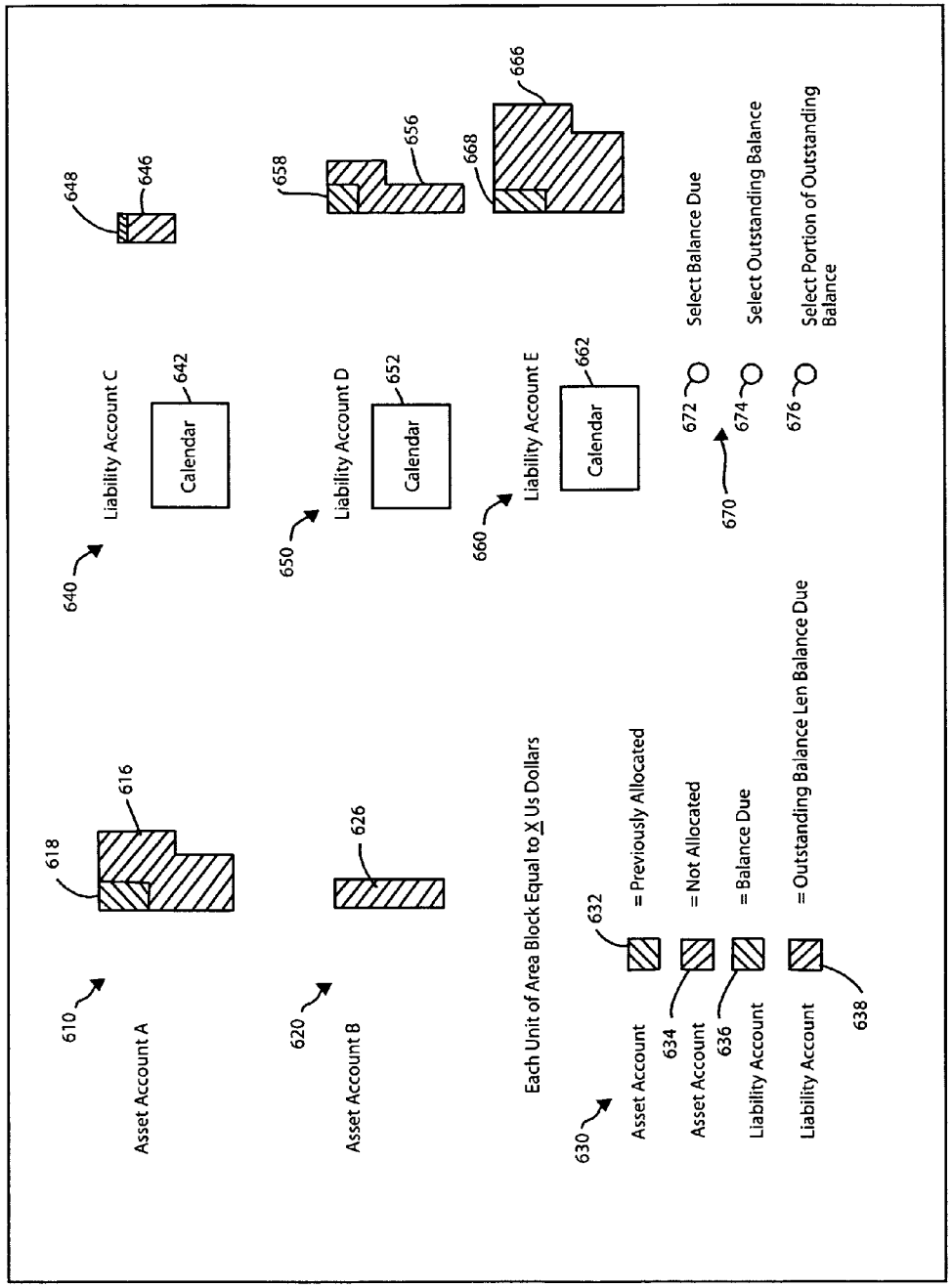
FIG. 6 depict user interfaces useful in relation to the method of FIG. 5.

Turning to FIG. 6A, examples of the proportionally sized regions representing balances are depicted on user interface 600 where the balance of an asset account 612 (represented by an allocated region 618 and non-allocated region 616) is approximately two and one half times as large as the balance of an asset account 620 (represented by a non-allocated region 626). The proportion of the account balances is represented by the physical area encompassed by the allocated and/or non-allocated regions associated with the accounts. Similar areas of size proportional to outstanding balances of liability accounts 640, 650, 660 using the same scale as that used with the aforementioned asset accounts can be provided. Thus, as an example, the outstanding balance of a liability account 640 is approximately half that of a liability account 650, with the outstanding balance portions represented by the combination of regions 646 and 648, and the combination of regions 656 and 658, respectively. Balance due regions 648, 658 represent the balance due on the respective liability accounts. The size proportions of the liability regions are on the same scale as those of the asset regions.

In another embodiment, the size proportions of the liability regions are on a different scale from those of the asset regions. For example, if an asset account is much larger than a liability account, the asset regions and liability regions can be set to different scales so that both financial accounts can be viewed in detail on the same screen.

In some cases, the scale of the region associated with a financial account may be changed in order to zoom in on the account. For example, the scale of a region associated with a liability account can be changed so that the graphical display of the region is larger, allowing precise selection of a portion of a liability account in order to make a payment.

In other cases, the scale of the region associated with a financial account can be changed to match the scale of another asset or liability account. For example, an area associated with a liability can be rescaled to match the scale of an area associated with an asset when the liability area is dragged and dropped onto a portion of the asset area.

Returning to FIG. 5, an indication of the type of account manipulation to be done via user interface 600 is received (block 520). Such account manipulation activities can include, but are not limited to, selecting an entire outstanding balance of a liability account for payment, selecting a portion of an outstanding balance for payment, selecting a balance due portion for payment, and/or the like. As depicted in FIG. 6A, a group of radial buttons 670 including a select balance due button 672, a select outstanding balance button 674, and a select portion of outstanding balance button 676 are included to receive the user's selection.

In operation, a user selects one of the radial buttons 670, one of the liability accounts 640, 650, 660 (and in some cases a graphical portion of the regions associated with the liability accounts), a date from a calendar 642, 652, 662 associated with the selected liability account, and also one of asset accounts 610, 620. This can cause a payment to be made from the selected asset account to the issuer of the selected liability account in the amount indicated by the selected radial button, and on the date selected via the calendar. The liability can be satisfied by causing an ACH transfer, or some similar financial transfer in the prescribed amount, and at the specified time. Thus, it would be possible for a consumer to satisfy obligations associated with various liability accounts by dragging the area associated with the liability and dropping the area on a portion of the asset area. This provides an intuitive approach for paying bills, and replaces the standard approach of writing checks drawn on asset accounts.

Figure 6B:
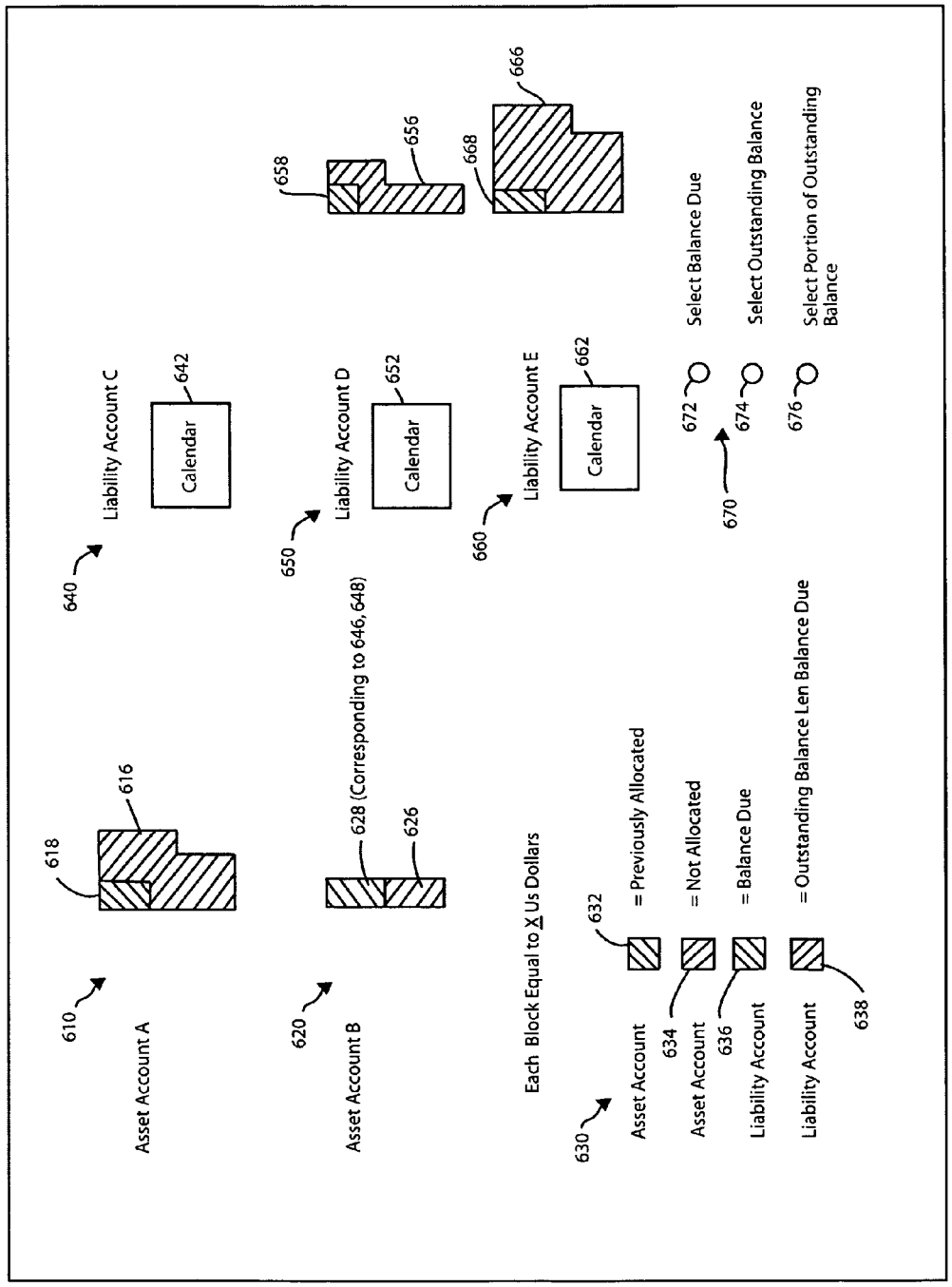

Some examples help to illustrate the concept. First, where select outstanding balance button 674 is selected (block 520), liability account 640 is selected (block 525), a date on calendar 642 is selected (block 530), and asset account 620 is selected (block 535), the graphical representation of liability account 640 including balance due region 646 and outstanding balance region 648 is moved into the graphical representation of asset account 620 (block 540). This is shown in FIG. 6B, where an allocated region 628 the same size as the combined regions 646 and 648 is superimposed on non-allocated region 626. This signifies that the portion of asset account 626 represented by region 628 has been allocated to satisfy the liability on the specified date. Also, regions 646 and 648 are removed from liability account 640 indicating that the liability is in process for satisfaction. Of note, user interface 600 can include a legend 630 indicating cross-hatching representing allocated portions of an asset account 632, non-allocated portions of an asset account 634, balance due portion of a liability account 636, and outstanding balance less balance due portion of a liability account 638. When the specified date is reached (block 545), the payment is made and region 628 is deleted from the graphical representation of asset account 620 (block 550). Again, this payment can be performed via an ACH transfer, or some other financial transfer process.

Figure 6C:
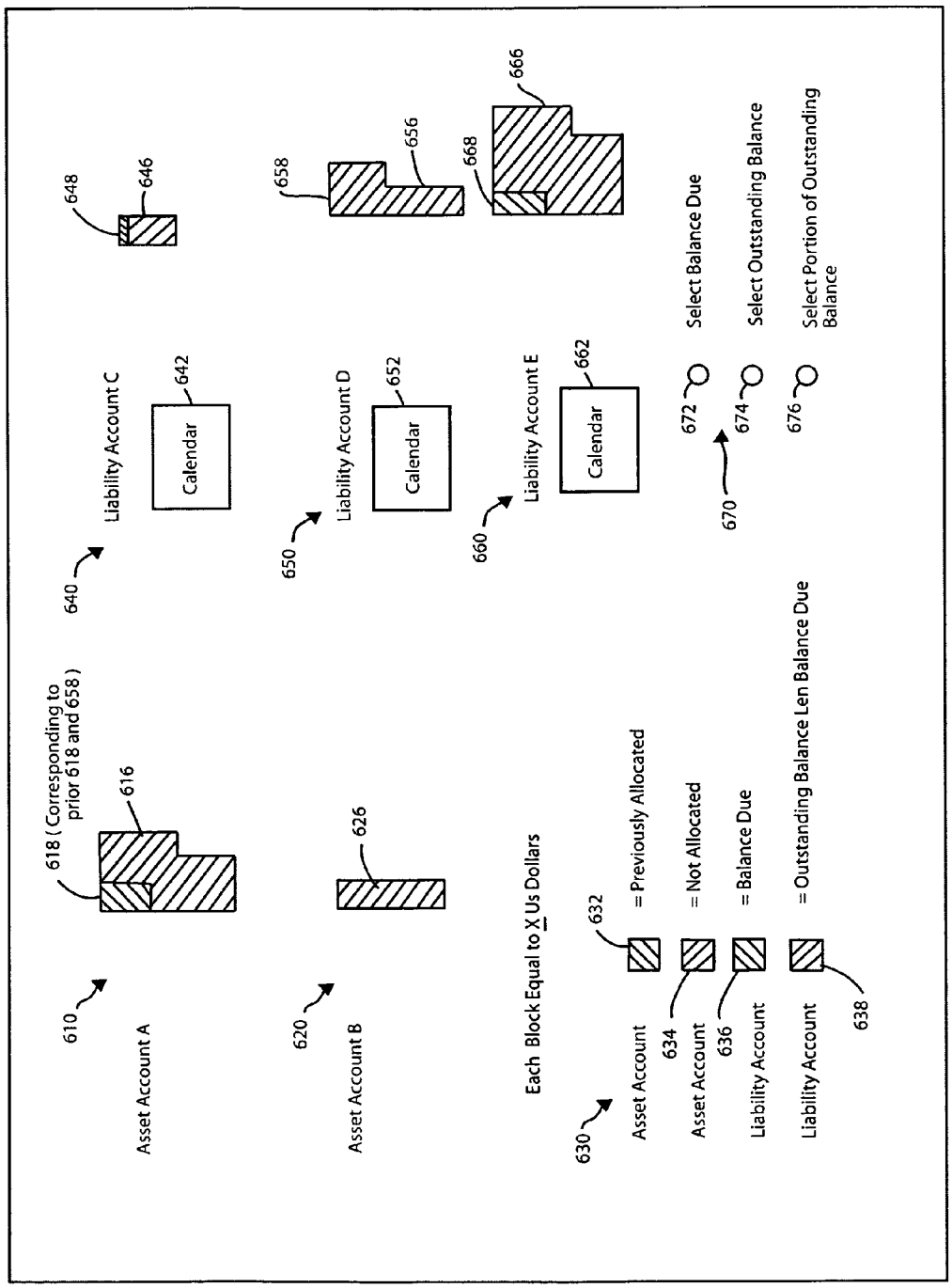

As another example, where select balance due button 672 is selected (block 520), liability account 650 is selected (block 555), a date on calendar 652 is selected (block 560), and asset account 610 is selected (block 565), the graphical representation of balance due 658 associated with account 650 is moved and superimposed over non-allocated portion 616 associated with asset account 610. This causes region 618 to increase in size corresponding to the size of balance due region 658, and region 656 to shrink a corresponding amount (block 570). This is shown in FIG. 6C where an allocated region 618 that is the same size as the combined prior region 618 and region 658 is superimposed on non-allocated region 616. This signifies that the portion of asset account 616 represented by region 618 has been allocated to satisfy the liability on the specified date. Again, when the specified date is reached (block 545), the payment is made and the portion of region 618 corresponding to prior region 658 is deleted from the graphical representation of asset account 610 (block 550).

As yet another example, where select portion of outstanding balance button 676 is selected (block 520), and a liability account, associated calendar date and asset account are selected (blocks 575-585), the user takes a cursor pointer and cuts out a segment of the selected liability balance and drags it to the selected asset account. From there, the selected segment is designated as allocated until it is paid, at which time the portion is removed (blocks 590, 545, 550).

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A system for implementing consumer based communication rules in relation to a financial account, the system comprising:
   a microprocessor based rule engine; and
   a computer readable medium, wherein the computer readable medium includes instructions executable by the microprocessor based rule engine to:
   receive a trigger, wherein the trigger indicates a correspondence associated with the financial account;
   receive a communication rule from a consumer participant associated with the financial account;
   incorporate the communication rule into a communication rule set maintained on the computer readable medium;
   access information associated with the financial account;
   apply the communication rule set to the information associated with the financial account, wherein a content of the correspondence is based at least in part on the application of the communication rule set.

2. The system of claim 1, wherein the financial account is part of an account group, wherein the communication rule is directed to a set of financial accounts from the account group, wherein the set of financial accounts is selected from a group consisting of: all accounts within the account group, a subset of accounts within the account group, and a single account within the account group.

3. The system of claim 2, wherein the instructions are further executable by the microprocessor based rule engine to:
   provide an output directed to one or more members associated with the account group, wherein the output includes the correspondence.

4. The system of claim 3, wherein the output is an electronic communication.

5. The system of claim 3, wherein the output is selected from a group consisting of: a paper letter, an insert, a presentation instrument carrier, and a message placed on a statement.

6. The system of claim 1, wherein the participant is a first participant, wherein at least a second participant is also associated with the financial account, wherein the communication rule is received from the first participant, and wherein the instructions are further executable by the microprocessor based rule engine to:
provide an output directed to the second participant, wherein the output includes the correspondence;
provide a set of canned messages, wherein the communication rule indicates one of the set of canned messages; and
incorporate the canned message into the output.

7. The system of claim 1, wherein the participant is a first participant, wherein at least a second participant is also associated with the financial account, wherein the communication rule is received from the first participant, wherein the communication rule includes a message provided by the first participant, and wherein the instructions are further executable by the microprocessor based rule engine to:
provide an output directed to the second participant, wherein the output includes the message provided by the first participant.

8. The system of claim 7, wherein the first participant is a senior party in an account group, wherein the second participant is a junior party in the account group, and wherein the financial account is part of the account group.

9. The system of claim 1, wherein the communication rule indicates a communication preference.

10. The system of claim 9, wherein the communication preference is selected from a group consisting of: a graphical presentation, a textual presentation, a summarized presentation, a multi-account presentation, and a message priority.

11. The system of claim 1, wherein the communication rule directs the merging of multiple communications.

12. A computer-implemented method for implementing consumer based communication rules in relation to a financial account, the method comprising:
receiving, at a microprocessor based rule engine, an indication of a financial account, wherein the indication identifies a consumer participant associated with the financial account;
providing, by the microprocessor based rule engine, a communication rules interface to the consumer participant over a communication network;
receiving, at the microprocessor based rule engine, a communication rule via the communication rules interface;
receiving, at the microprocessor based rule engine, a trigger, wherein the trigger indicates a correspondence associated with the financial account;
accessing, by the microprocessor based rule engine, information associated with the financial account; and
applying, by the microprocessor based rule engine, the communication rule to the information associated with the financial account, wherein a content of the correspondence is based at least in part on the application of the communication rule.

13. The method of claim 12, wherein the participant is a first participant, wherein at least a second participant is also associated with the financial account, wherein the communication rule is received from the first participant, and wherein the method further comprises:
providing, by the microprocessor based rule engine, an output directed to the second participant, wherein the output includes the correspondence;
providing, by the microprocessor based rule engine, a set of canned messages, wherein the communication rule indicates one of the set of canned messages; and
incorporating, by the microprocessor based rule engine, the canned message into the output.

14. The method of claim 12, wherein the communication rule includes a message provided by the participant, and wherein the method further comprises:
providing, by the microprocessor based rule engine, an output directed to the participant, wherein the output includes the message provided by the participant.

15. The method of claim 12, wherein the communication rule directs the merging of multiple communications.

16. A computer-implemented method for implementing consumer based communication rules in relation to an account group, the method comprising:
receiving, at a microprocessor based rule engine, an indication of an account group, wherein the indication identifies a member of the account group, and wherein the account group includes at least a first financial account and a second financial account;
providing, by the microprocessor based rule engine, a communication rules interface to the member over a communication network;
receiving, at the microprocessor based rule engine, a communication rule via the communication rules interface;
accessing, by the microprocessor based rule engine, information associated with the account group; and
applying, by the microprocessor based rule engine, the communication rule to the information associated with the account group.

17. The method of claim 16, wherein the method further includes generating, by the microprocessor based rule engine, an output directed to one or more members associated with the account group, wherein the output is based at least in part on the application of the communication rule to the information associated with the first financial account and the information associated with the second financial account.

18. The method of claim 17, wherein the output is selected from a group consisting of: an electronic communication, and a paper communication.

19. The method of claim 17, wherein at least a first member and a second member are associated with the account group, wherein the communication rule is received from the first member, wherein the output is directed to the second member, and wherein the method further comprises:
providing, by the microprocessor based rule engine, a set of canned messages, wherein the communication rule indicates one of the set of canned messages; and
incorporating, by the microprocessor based rule engine, the one of the canned message into the output.

20. The method of claim 19, wherein the combination of the first member and the second member is selected from a group consisting of: a combination where the first member is a senior party and the second member is a junior party, a combination where the first member is a junior member and the second member is a senior member, and a combination where the first member and the second member are of equal status.

21. The method of claim 16, wherein the first financial account is a liability account, and wherein the second financial account is an asset account.

22. The method of claim 16 wherein the communication rule directs production of a comprehensive report about the account group.

23. A computer-implemented method, comprising:
receiving, by a microprocessor based rule engine at a financial institution at which a consumer maintains an account, an indication from the consumer that a communication, from the financial institution and regarding the account, is to include content selected by the consumer;

receiving, from the consumer by the microprocessor based rule engine at the financial institution, an indication of what the consumer-selected content is to be;

including, by the microprocessor based rule engine, the consumer-selected content in the communication; and sending, by the microprocessor based rule engine, the communication.

24. The method of claim 23, wherein the indication of what the consumer-selected content is to be comprises a selection by the consumer of a message from a set of canned messages.

25. The method of claim 23, wherein the indication of what the consumer-selected content is to be comprises composition by the consumer of the consumer-selected content.

26. The method of claim 23, wherein the consumer is one of at least two joint holders of the account, and wherein the consumer-selected content is directed from one joint holder to at least one other joint holder.

27. The method of claim 23, wherein the consumer is a member of an account group, and wherein the communication is sent to at least one other member of the account group.

* * * * *